(12) United States Patent
Umezawa (10) Patent No.: US 8,966,140 B2
(45) Date of Patent: Feb. 24, 2015

(54) DATA TRANSFER APPARATUS AND DATA TRANSFER METHOD

(75) Inventor: Yasushi Umezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 861 days.

(21) Appl. No.: 13/115,982

(22) Filed: May 25, 2011

(65) Prior Publication Data

US 2011/0302339 A1 Dec. 8, 2011

(30) Foreign Application Priority Data

Jun. 3, 2010 (JP) ................................. 2010-127834

(51) Int. Cl.
*G06F 13/12* (2006.01)
*G08C 15/00* (2006.01)
*H04L 12/801* (2013.01)
*H04L 12/861* (2013.01)

(52) U.S. Cl.
CPC ................ *H04L 47/12* (2013.01); *H04L 49/90* (2013.01)
USPC ............................................ 710/52; 370/230

(58) Field of Classification Search
CPC .................................. H04L 47/30; H04L 47/10
USPC .......................................................... 710/52
See application file for complete search history.

(56) References Cited

U.S. PATENT DOCUMENTS 6,690,646 B1 * 2/2004 Fichou et al. ................. 370/231
2008/0181105 A1 * 7/2008 Iwasaki .......................... 370/230

FOREIGN PATENT DOCUMENTS

JP 2008-042654 A 2/2008
JP 2009-147615 7/2009

* cited by examiner

*Primary Examiner* — Titus Wong
(74) *Attorney, Agent, or Firm* — Staas & Halsey LLP (57) ABSTRACT

A data transfer apparatus includes a plurality of input ports, a plurality of output ports and a switch unit between the plurality of input ports and the plurality of output ports. Each input port includes an input buffer configured to store input data including destination information indicating destinations of respective pieces of the input data, a first buffer monitoring unit configured to monitor a first usage rate of the input buffer, and a first frequency control unit configured to control a first operating frequency of the input buffer on the basis of the first usage rate. Each output port includes an output buffer configured to store output data, a second buffer monitoring unit configured to monitor a second usage rate of the output buffer, and a second frequency control unit configured to control a second operating frequency of the output buffer on the basis of the second usage rate.

16 Claims, 7 Drawing Sheets

DATA TRANSFER APPARATUS AND DATA TRANSFER METHOD

CROSS-REFERENCE TO RELATED APPLICATION

This application is based upon and claims the benefit of priority of the prior Japanese Patent Application No. 2010-127834, filed on Jun. 3, 2010, the entire contents of which are incorporated herein by reference.

FIELD

The embodiments disclosed herein relate to a data transfer apparatus and a data transfer method.

BACKGROUND

A data transfer apparatus is proposed which controls the throughput of a data processing device between a pre-stage buffer memory and a post-stage buffer memory according to the used amounts of the pre-stage buffer memory and the post-stage buffer memory.

A packet transfer apparatus is proposed which realizes power saving by predicting a band to be used and increasing/decreasing the transfer performance on the basis of information transmitted and received between terminals.

Japanese Laid-open Patent Publication No. 2008-42654 and Japanese Laid-open Patent Publication No. 2009-147615 are examples of related art.

SUMMARY

According to an aspect of the embodiments, a data transfer apparatus includes a plurality of input ports, a plurality of output ports and a switch unit provided between the plurality of input ports and the plurality of output ports. Each of the plurality of input ports includes an input buffer configured to store input data including destination information indicating destinations of respective pieces of the input data, a first buffer monitoring unit configured to monitor a first usage rate of the input buffer, and a first frequency control unit configured to control a first operating frequency on the basis of the first usage rate, the first operating frequency being an operating frequency of the input buffer. Each of the plurality of output ports includes an output buffer configured to store output data, a second buffer monitoring unit configured to monitor a second usage rate of the output buffer, and a second frequency control unit configured to control a second operating frequency on the basis of the second usage rate, the second operating frequency being an operating frequency of the output buffer. The switch unit is configured to supply a piece of the input data, as a piece of the output data, to the output port corresponding to the destination of the piece of the input data on the basis of the destination information.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described.

First Embodiment

Hereinafter, a first embodiment will be described with reference to FIGS. 1 to 5.

Figure 1:
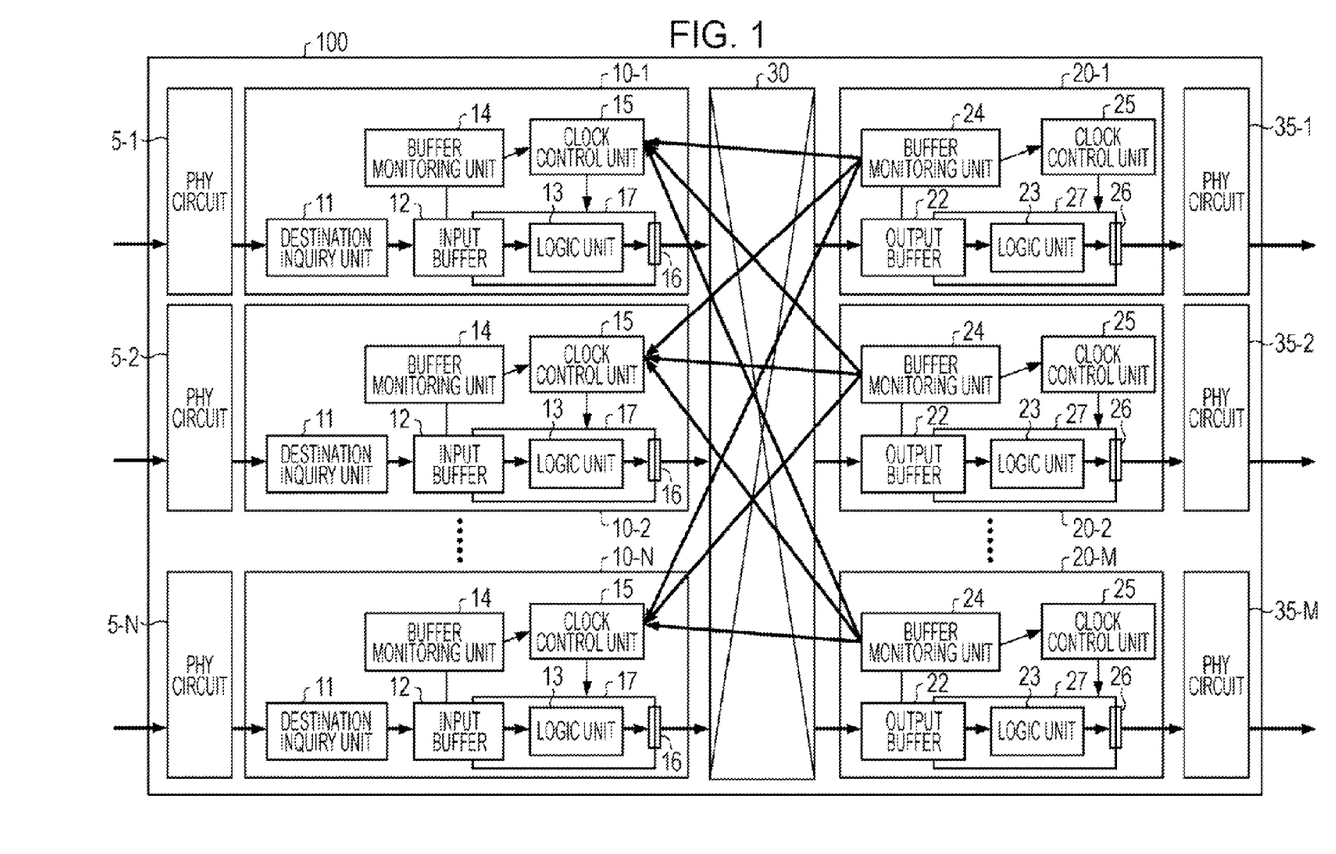
FIG. 1 is a block diagram of a data transfer apparatus according to an embodiment.

FIG. 1 is a block diagram of a data transfer apparatus 100, which is a network switch or a router, according to the first embodiment. The data transfer apparatus 100 is, for example, an LSI (Large Scale Integrated circuit).

The data transfer apparatus 100 includes a plurality of (in the case of FIG. 1, N) input ports 10-1 to 10-N to which data (hereinafter, for example, data indicates a frame) is inputted from an external communication network. The N input ports 10-1 to 10-N are respectively connected to, for example, different N communication lines included in the external communication network. Parallel-serial conversion and serial-parallel conversion circuits (hereinafter simply referred to as PHY circuits) 5-1 to 5-N are provided between the N input ports 10-1 to 10-N and the external communication network. The parallel-serial conversion and serial-parallel conversion units 5-1 to 5-N convert data transferred from the external communication network by a high-speed serial transfer method (for example, 10 [Gb/s]) into data format of parallel transfer method (for example, 312.5 [MHz]) and respectively transfer the data to the input ports 10-1 to 10-N.

The data transfer apparatus 100 also includes a plurality of (in the case of FIG. 1, M) output ports 20-1 to 20-M from which data are outputted to an external communication network. The M output ports 20-1 to 20-M are respectively connected to, for example, different M communication lines included in the external communication network. Parallel-serial conversion and serial-parallel conversion circuits (hereinafter simply referred to as PHY circuits) 35-1 to 35-M are provided between the M output ports 20-1 to 20-M and the external communication network. For example, when the data format in the data transfer apparatus 100 is a data format of parallel transfer method (in the above example, 312.5

[MHz]), the parallel-serial conversion and serial-parallel conversion units 35-1 to 35-M convert the data format of the parallel transfer method into data of high-speed serial transfer method (in the above example, 10 [Gb/s]) and output the data to the external communication network.

The N input ports 10-1 to 10-N and the M output ports 20-1 to 20-M are connected by a crossbar circuit (an example of a switch) 30. The crossbar circuit 30 inputs data outputted from one of the N input ports 10-1 to 10-N into one of the N output ports 20-1 to 20-M, which corresponds to the destination of the data. Here, the output port that corresponds to the destination of the data means an output port connected to a communication line along a communication path through which the data reaches the destination of the data.

Next, a configuration of each input port (hereinafter may be simply referred to as "input port 10") included in the N input ports 10-1 to 10-N will be described.

The input port 10 includes a destination inquiry unit 11, an input buffer memory 12, a logic unit (an example of a first processing unit) 13, a buffer monitoring unit (an example of a first buffer monitoring unit) 14, a clock control unit (an example of a first operating frequency control unit) 15, and a synchronizing circuit 16. The destination inquiry unit 11 obtains destination information of data from a header portion of the data inputted in the input port 10.

The input buffer memory 12 sequentially stores data inputted in the input port 10. The logic unit 13 performs packet processing by ACL (Access Control List) or the like. The ACL means a function for setting enable/disable of packet communication by specifying an IP address and a port number, or a table corresponding to the function.

The synchronizing circuit 16 changes a state of data from a state synchronizing with a first clock in a first clock domain to a state synchronizing with a second clock in a second clock domain when the data is transferred across the boundary between the two clock domains different from each other. Here, a clock domain 17 to which the logic unit 13 of the input port 10 belongs is the first clock domain. A clock domain in the crossbar circuit 30 that processes data outputted from the input port 10 is the second clock domain. The clock domain means a circuit area (partial circuit) driven by a certain clock signal. A circuit example of the synchronizing circuit 16 will be described with reference to FIG. 2.

Figure 2:
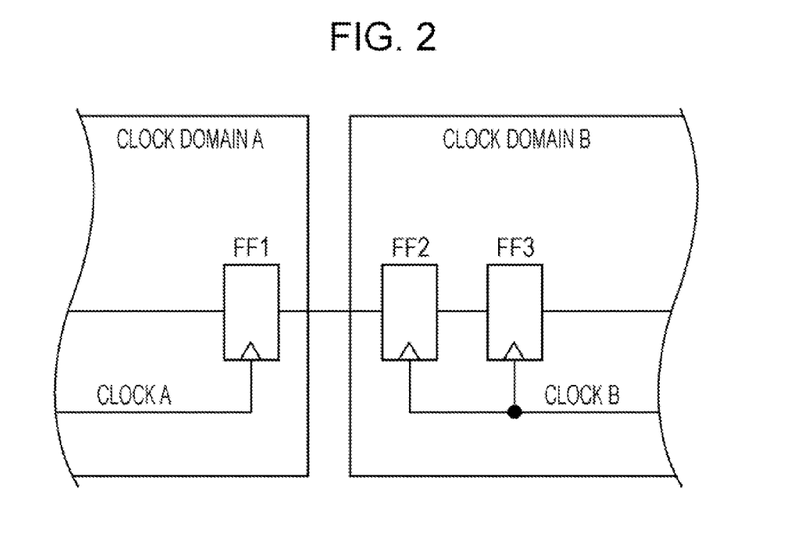
FIG. 2 is a circuit diagram showing a circuit example of a synchronizing circuit shown in FIG. 1.

As shown in FIG. 2, the synchronizing circuit 16 includes, for example, three flip-flops FF1, FF2, and FF3 connected in series each other. The flip-flop FF1 belongs to the first clock domain (clock domain A) and the flip-flops FF2 and FF3 belong to the second clock domain (clock domain B). The flip-flop FF1 is driven by the first clock signal (clock A) in the clock domain A and the flip-flops FF2 and FF3 are driven by the second clock signal (clock B) in the clock domain B. Here, the reason why the series circuit of the two flip-flops FF2 and FF3 is provided in the clock domain B on the receiving side is as follows. Even when a so-called metastable state occurs in the first flip flop FF2 and a receiving signal becomes unstable, a stable receiving signal can be obtained by causing the receiving signal to pass through the second flip-flop FF3. Here, the metastable state means a state in which, when a signal of different clock domain is received, the receiving signal becomes unstable owing to the setup time and the hold time of the flip-flop on the receiving side.

The buffer monitoring unit 14 obtains a current usage rate of the input buffer memory 12. The current usage rate of the input buffer memory 12 means a ratio of a portion of the input buffer memory 12, which is currently used by stored data, to a total storage capacity of the input buffer memory 12. For example, when a half of the total storage capacity is used by stored data, the usage rate of the input buffer memory 12 is 50%, and when 75% of the total storage capacity is used by stored data, the usage rate of the input buffer memory 12 is 75%.

The clock control unit 15 controls the operating frequency of the input buffer memory 12 and the logic unit 13 in accordance with the current usage rate of the input buffer memory 12 obtained by the buffer monitoring unit 14. Here, in the input port 10, the input buffer memory 12 and the logic unit 13 belong to the same clock domain 17. In other words, the input buffer memory 12 and the logic unit 13 are driven by the same clock signal. Thus, the operating frequency of the input buffer memory 12 and the logic unit 13 means the frequency of the clock signal.

Next, a configuration of each output port (hereinafter may be simply referred to as "output port 20") included in the M output ports 20-1 to 20-M will be described. The output port 20 includes an output buffer memory 22, a logic unit (second processing unit) 23, a buffer monitoring unit (second buffer monitoring unit) 24, a clock control unit (second operating frequency control unit) 25, and a synchronizing circuit 26.

The output buffer memory 22 sequentially stores data inputted into the output port 20 from the crossbar circuit 30. The logic unit 23 controls flow of transmitting the data stored in the output buffer memory 22 from the output port 20. In the flow control, when the processing performance of the apparatus on the data receiving side cannot catch up with the data transmitting speed, the apparatus on the data receiving side issues an instruction to the data transfer apparatus 100 on the data transmitting side, and the logic unit 23 receives the instruction and temporarily stops transmitting the data so as to adjust the data transfer speed to be appropriate.

The synchronizing circuit 26 has the same configuration as that of the synchronizing circuit 16, and the clock domain 27 to which the output buffer memory 22 and the logic unit 23 of the output port 20 belong is the first clock domain. A clock domain to which a corresponding one of the PHY circuits 35-1 to 35-M that process data which is extracted from the output buffer memory 22 and outputted from the output port 20 via the logic unit 23 belongs is the second clock domain.

The buffer monitoring unit 24 obtains a current usage rate of the output buffer memory 22. The current usage rate of the output buffer memory 22 means a ratio of a portion of the output buffer memory 22, which is currently used by stored data, to a total storage capacity of the output buffer memory 22. For example, when a half of the total storage capacity is used by stored data, the usage rate of the output buffer memory 22 is 50%, and when 75% of the total storage capacity is used by stored data, the usage rate of the output buffer memory 22 is 75%.

The clock control unit 25 controls the operating frequency of the output buffer memory 22 and the logic unit 23 in accordance with the current usage rate of the output buffer memory 22 obtained by the buffer monitoring unit 24. Here, in the output port 20, the output buffer memory 22 and the logic unit 23 belong to the same clock domain 27. In other words, the output buffer memory 22 and the logic unit 23 are driven by the same clock signal. Thus, the operating frequency of the output buffer memory 22 and the logic unit 23 means the frequency of the clock signal.

Next, a control method of the operating frequency of the input buffer memory 12 and the logic unit 13 in the input port 10 and a control method of the operating frequency of the output buffer memory 22 and the logic unit 23 in the output port 20 will be described with reference to FIG. 3.

In each of the input port 10 and the output port 20, the clock signal is distributed to semiconductor elements in the input buffer memory 12 or the output buffer memory 22 and the logic unit 13 or 23 by a clock tree. As shown in FIG. 3, the clock tree includes clock buffers B2 to B11. As a result, the input buffer memory 12 or the output buffer memory 22 and the logic unit 13 or 23 are driven by the clock signal.

Next, a supply of the clock signal to the clock tree will be described. A clock signal is supplied from outside to the data transfer apparatus 100 described with reference to FIG. 1, and the clock signal is inputted into PLL (Phase Locked Loop) 40 shown in FIG. 3. In the data transfer apparatus 100, the PLL 40 is provided separately from the PHY circuits 5-1 to 5-N, the input ports 10-1 to 10-N, the crossbar circuit 30, the output ports 20-1 to 20-M, and the PHY circuits 35-1 to 35-M. The PLL 40 generates a clock signal to be supplied to the inside of the data transfer apparatus 100 by using the clock signal supplied from the outside. The generated clock signal is supplied to the input ports 10-1 to 10-N, the crossbar circuit 30, the output ports 20-1 to 20-M, and the PHY circuits 35-1 to 35-M.

Figure 3:
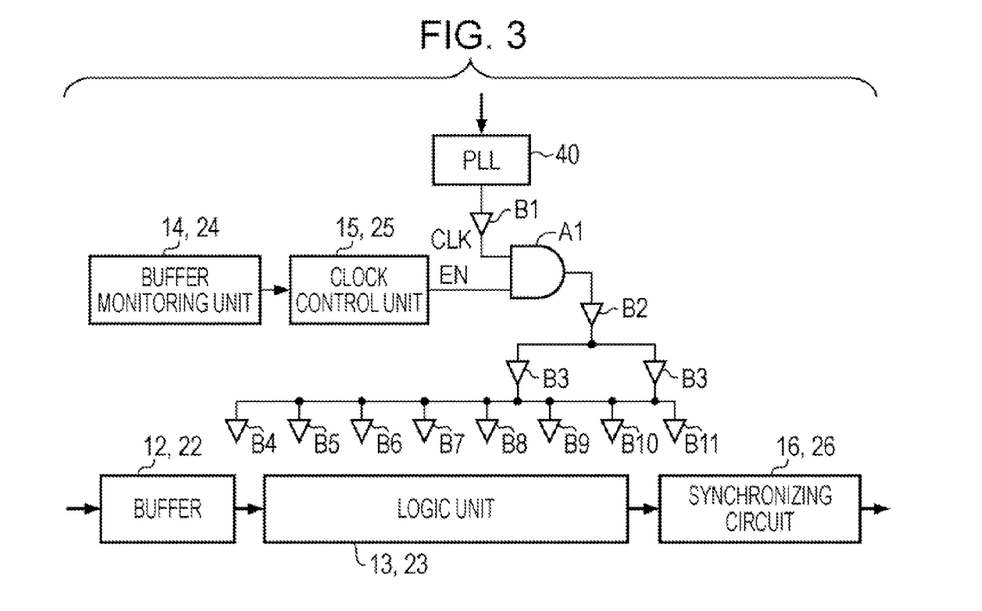
FIG. 3 is a circuit diagram for explaining a method for changing an operating frequency by clock gating applicable to the data transfer apparatus shown in FIG. 1.

As shown in FIG. 3, the input port 10 and the output port 20 each include a clock buffer B1 and an AND (logical AND) circuit A1, and the clock signal CLK supplied from the PLL 40 is inputted into the AND circuit A1 via the clock buffer B1. As the other input of the AND circuit, an enable signal EN is inputted from the clock control unit 15 or 25. As a result, the clock signal CLK inputted into the AND circuit A1 is outputted to the clock tree through the AND circuit A1 while the enable signal EN is asserted. On the other hand, the clock signal CLK inputted into the AND circuit A1 does not pass through the AND circuit and is blocked off while the enable signal EN is negated.

Therefore, the clock control unit 15 or 25 periodically cuts off a clock pulse from the clock signal CLK supplied from the PLL 40 by periodically negating the enable signal EN. As a result, the frequency of the clock signal CLK is reduced and the clock signal whose frequency is reduced is supplied to the input buffer memory 12 or the output buffer memory 22 and the logic unit 13 or 23 by the clock tree. As the frequency of the clock signal is reduced, the operating frequency of the input buffer memory 12 or the output buffer memory 22 and the logic unit 13 or 23 reduces, and the power consumption of the input buffer memory 12 or the output buffer memory 22 and the logic unit 13 or 23 reduces. As a result, a power saving of the input port 10 or the output port 20 can be achieved. The above-described method in which a gate circuit (AND circuit A1 in the example of FIG. 3) is inserted in a supply path of the clock signal and clock pulses are cut off or passed through to a circuit area beyond the gate circuit may be referred to as a clock gating method.

Figure 4:
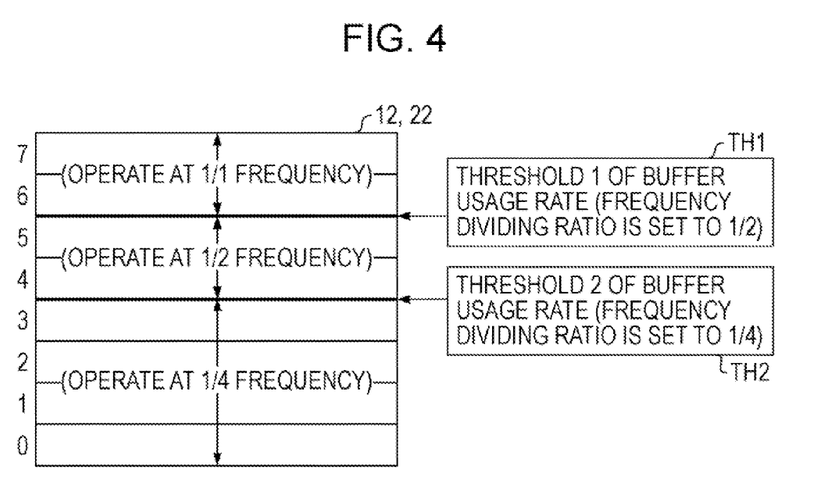
FIG. 4 is a diagram for explaining a control method (1) for controlling an operating frequency according to the usage rate of a buffer memory applicable to the data transfer apparatus shown in FIG. 1.

Next, examples of numerical values in the operating frequency control in the input port 10 or the output port 20 is described with reference to FIG. 4. FIG. 4 is a pattern diagram of the input buffer memory 12 or the output buffer memory 22. For convenience of description, FIG. 4 shows a diagram in which the total storage capacity of the input buffer memory 12 or the output buffer memory 22 is divided into 8 portions (0 to 7). As threshold values of the usage rate of the input buffer memory 12 or the output buffer memory 22, TH1 (second or fourth threshold value) and TH2 (first or third threshold value) are set. Here, TH1 is greater than TH2. The threshold value TH1 corresponds to the usage rate of the input buffer memory 12 or the output buffer memory 22=3/4 (=6/8=0.75). The threshold value TH2 corresponds to the usage rate of the input buffer memory 12 or the output buffer memory 22=1/2 (=4/8=0.5).

As shown in FIG. 4, for example, the operating frequency is controlled by the control method of the operating frequency described above with reference to FIG. 3. Specifically, when the usage rate (R) of the input buffer memory 12 is smaller than or equal to the threshold value TH2 (R≤TH2), the clock control unit 15 of the input port 10 reduces the operating frequency in the clock domain 17 to 1/4 (first ratio) of the frequency of the clock signal CLK supplied from the PLL 40. When the usage rate of the input buffer memory 12 is greater than the threshold value TH2 and smaller than or equal to the threshold value TH1 (TH2<R≤TH1), the clock control unit 15 of the input port 10 reduces the operating frequency in the clock domain 17 to 1/2 (second ratio) of the frequency of the clock signal CLK. The first ratio is greater than the second ratio. Further, when the usage rate of the input buffer memory 12 is greater than the threshold value TH1 (TH1<R), the clock control unit 15 of the input port 10 does not reduce the frequency of the clock signal CLK and uses the clock signal CLK without change (1/1) as the operating frequency in the clock domain 17.

When the usage rate of the output buffer memory 22 is smaller than or equal to the threshold value TH2 (R≤TH2), the clock control unit 25 of the output port 20 reduces the operating frequency in the clock domain 27 to 1/4 (third ratio) of the frequency of the clock signal CLK supplied from the PLL 40. Similarly, when the usage rate of the output buffer memory 22 is greater than the threshold value TH2 and smaller than or equal to the threshold value TH1 (TH2<R≤TH1), the clock control unit 25 of the output port 20 reduces the operating frequency in the clock domain 27 to 1/2 (fourth ratio) of the frequency of the clock signal CLK. The third ratio is greater than the fourth ratio. Further, when the usage rate of the output buffer memory 22 is greater than the threshold value TH1 (TH1<R), the clock control unit 25 of the output port 20 does not reduce the frequency of the clock signal CLK and uses the clock signal CLK without change (1/1) as the operating frequency in the clock domain 27.

"Power saving mode" in which the operating frequency is controlled according to the usage rate of the input buffer memory 12 or the output buffer memory 22 is described above with reference to FIG. 4, and whether or not the "power saving mode" is applied to the data transfer apparatus 100 can be set. For this purpose, the clock control units 15 and 25 each can include, for example, a 1-bit first register (not shown in the figures). Also, the clock control units 15 and 25 each can include a 3-bit register as a second register that specifies the threshold values TH1 and TH2 of the usage rate of the input buffer memory 12 or the output buffer memory 22 whose storage capacity is divided into 8 portions as described above. By using the 3 bits, it is possible to specify 8 numbers of 0 to 7 that indicate the usage rate of the storage capacity divided into 8 portions. Further, the clock control units 15 and 25 each can include a 2-bit register as a third register that specifies a reduction ratio (frequency division ratio) of the operating frequency. For example, by using the 2 bits, it is possible to specify 4 numbers of 0 to 3. By using the numbers, it is possible to set the reduction ratio 1/1 by 0, the reduction ratio 1/2 by 1, and the reduction ratio 1/4 by 2. In this way, 3-level settings can be made.

Next, a modification example of the first embodiment will be described with reference to FIG. 5. In the modification example, the input buffer memory 12 or the output buffer memory 22 are divided into a plurality of portions, and the operating frequency is controlled according to the usage rate of each divided portion. The configuration other than the above is the same as that of the first embodiment, and redundant description will be omitted.

The input buffer memory 12 or the output buffer memory 22 is divided as described below. As an example, when dividing the input buffer memory 12, the output ports 20-1 to 20-M corresponding to destinations of data stored in the input buffer memory 12 are divided into groups, and the input buffer memory 12 is divided for each group (for example, the input buffer memory 12 is divided into 2 portions). Similarly, when dividing the output buffer memory 22, the input ports 10-1 to 10-N that output data to be stored in the output buffer memory 22 are divided into groups, and the output buffer memory 22 is divided for each group (for example, the output buffer memory 22 is divided into 2 portions). As another example, when the data have priorities, the input buffer memory 12 and the output buffer memory 22 are divided for each priority.

Figure 5:
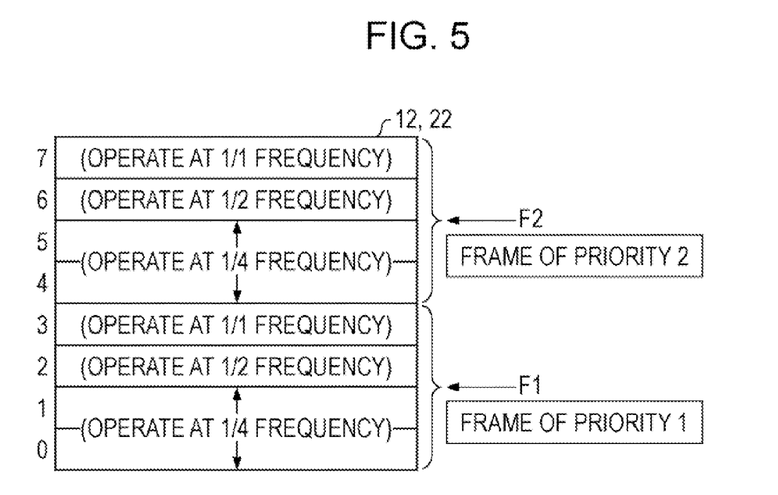
FIG. 5 is a diagram for explaining a control method (2) for controlling an operating frequency according to the usage rate of a buffer memory applicable to the data transfer apparatus shown in FIG. 1.

FIG. 5 shows the case in the input buffer memory 12 and the output buffer memory 22 are divided for each data priority as described above. The total storage capacities of the input buffer memory 12 and the output buffer memory 22 are each divided into 8 areas (0 to 7) as shown in FIG. 5. The areas 0 to 3 are defined as a portion F1 that stores data of priority 1, and the areas 4 to 7 are defined as a portion F2 that stores data of priority 2.

In this case, the logic units 13 and 23 and the synchronizing circuits 16 and 26 of the input port 10 and the output port 20 may be each divided into portions for processing data in the portion F1 and for processing data in the portion F2 in the same way as the input buffer memory 12 and the output buffer memory 22. In this case, the clock control units 15 and 25 of the input port 10 and the output port 20 control the operating frequency of the portion that processes data in the portion F1 in the clock domains 17 and 27 of the input port 10 and the output port 20 in accordance with the usage rate of the portion F1. Similarly, the clock control units 15 and 25 of the input port 10 and the output port 20 control the operating frequency of the portion that processes data in the portion F2 in the clock domains 17 and 27 of the input port 10 and the output port 20 in accordance with the usage rate of the portion F2. In this case, regarding the registers to be used, except for the first register, the number of the second and the third registers that are provided for each of the input buffer memory 12 and the output buffer memory 22 is the same as the number of the divided portions. Specifically, when the buffer memory is divided into two portions, two second registers and two third registers are provided.

Or, the logic units 13 and 23 and the synchronizing circuits 16 and 26 of the input port 10 and the output port 20 may process the data of both portions F1 and F2 in common. In this case, the clock control units 15 and 25 of the input port 10 and the output port 20 control the operating frequency in the clock domains 17 and 27 of the input port 10 and the output port 20 in accordance with the usage rate of either one of the portions F1 and F2. It is possible to set only either one of the portions F1 and F2. In this case, one second register and one third register can be provided and shared by the divided two portions.

As shown in FIG. 5, when data are stored in the areas 0 to 3 in the portion F1 (usage rate=100%), the frequency of the clock signal CLK is not reduced and used without change as the operating frequency. When data are stored in the areas 0 to 2 (usage rate=75%), the frequency of the clock signal CLK is reduced to 1/2 and used as the operating frequency. When data are stored in the areas 0 to 1 (usage rate=50%), the frequency of the clock signal CLK is reduced to 1/4 and used as the operating frequency. Similarly, when data are stored in the areas 4 to 7 in the portion F2 (usage rate=100%), the frequency of the clock signal CLK is not reduced and used without change as the operating frequency. When data are stored in the areas 4 to 6 (usage rate=75%), the frequency of the clock signal CLK is reduced to 1/2 and used as the operating frequency. When data are stored in the areas 4 to 5 (usage rate=50%), the frequency of the clock signal CLK is reduced to 1/4 and used as the operating frequency.

So far, a method has been described for controlling the operating frequency according to the usage rate of the buffer memory in the case in which the input buffer memory 12 and the output buffer memory 22 are divided for each priority of data. Here, when the input buffer memory 12 is divided for each group of output ports of destinations of data as described above, it is possible to control the operating frequency according to the usage rate of the buffer memory by the same method as that described above with reference to FIG. 5. Similarly, when the output buffer memory 22 is divided for each group of input ports that output data as described above, it is possible to control the operating frequency according to the usage rate of the buffer memory by the same method as that described above with reference to FIG. 5.

As described above, according to the first embodiment, the lower the usage rate of the input buffer memory 12 of the input port 10 or the output buffer memory 22 of the output port 20 is, the more largely the operating frequency is reduced. As a result, power saving can be effectively achieved. On the other hand, the higher the usage rate of the input buffer memory 12 or the output buffer memory 22 is, the less largely the operating frequency is reduced or the operating frequency is not reduced. As a result, a situation is difficult to occur in which the usage rate of the input buffer memory 12 or the output buffer memory 22 becomes 100% and data cannot be inputted into the input port 10 or the output port 20 as the operating frequency is largely reduced while the usage rate of the input buffer memory 12 or the output buffer memory 22 is high.

Second Embodiment

Hereinafter, a second embodiment will be described with reference to FIGS. 6 to 9.

Since the data transfer apparatus according to the second embodiment has the same configuration as that of the first embodiment described above with reference to FIGS. 1 to 5, portions different from the first embodiment will be described and a redundant description of the same portions as those of the first embodiment will be properly omitted.

In the second embodiment, the operating frequency in the clock domain 17 of each input port 10 is controlled by considering not only the usage rate of the input buffer memory 12 of the input port but also the usage rate of the output buffer memory 22 of the output port 20. Specifically, when the usage rate of the output buffer memory 22 of the output port 20 corresponding to the destination of data stored in the input buffer 12 is high, the operating frequency in the clock domain 17 of the input port 10 is properly reduced to realize power saving.

Here, it is assumed a case in which the amount of data inputted into the output port 20 is larger than the amount of data outputted from the output port 20 (occurrence of a so-called congestion). In this case, the usage rate of the output buffer memory 22 becomes 100%, and thereafter, a situation occurs in which data cannot be inputted into the output port 20 from the input port 10 until a free space is generated in the output buffer memory 22.

Therefore, in the second embodiment, as described above, when the usage rate of the output buffer memory 22 of the output port 20 corresponding to the destination of data stored in the input buffer 12 is high, the operating frequency in the clock domain 17 of the input port 10 is properly reduced. As a result, the amount of data outputted from the input port 10 is reduced, so that the timing when the data which is stored in the input buffer memory 12 of the input port 10 and has the destination corresponding to the output port 20 is inputted into the output port is delayed. As a result, the amount of data inputted into the output port 20 is reduced, so that the situation as described above, specifically, the situation in which the usage rate of the output buffer memory 22 of the output port 20 becomes 100% and data cannot be inputted into the output port 20 thereafter can be avoided. In this way, according to the second embodiment, by reducing the operating frequency in the clock domain 17 of the input port 10 when congestion occurs, power saving is realized, and at the same time, the situation in which the usage rate of the output buffer memory 22 becomes 100% and data cannot be inputted into the output port 20 thereafter is avoided.

Figure 6:
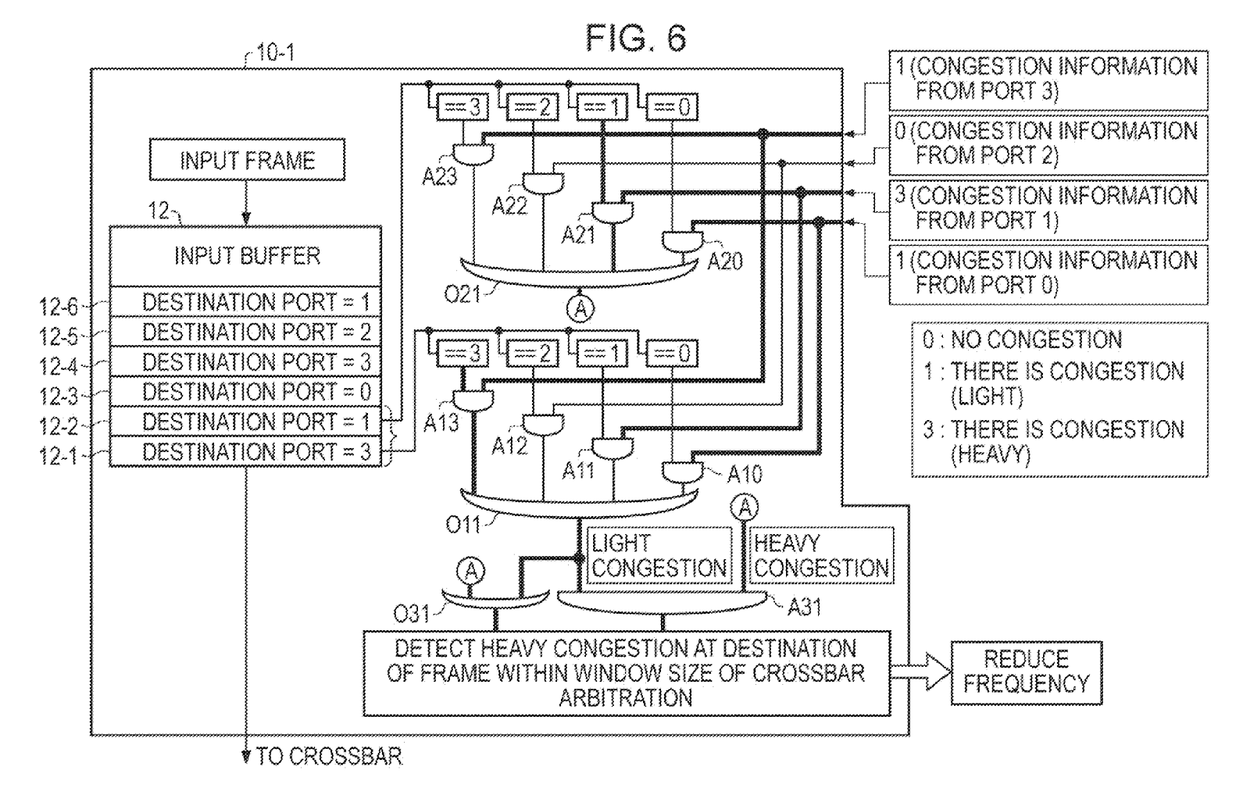
FIG. 6 is a diagram for explaining a control method for controlling an operating frequency by using congestion information applicable to the data transfer apparatus shown in FIG. 1.

FIG. 6 is a diagram for explaining a configuration which reduces the operating frequency in the clock domain 17 of the input port 10 when the congestion occurs and which can be applied to the data transfer apparatus 100 according to the second embodiment. For convenience of description, in FIGS. 6 and 7 and the description below, "output port corresponding to the destination of data" may be simply referred to as "destination port" or "destination".

In the case of the configuration of FIG. 6, the clock control unit 15 of each input port 10 includes AND (logical AND) circuits A10, A11, A12, and A13, OR (logical OR) circuit O11, AND circuits A20, A21, A22, and A23, OR circuit 021, AND circuit A31, and OR circuit O31. Here, for convenience of description, the data transfer apparatus 100 is assumed to include 4 output ports 20, and the 4 output ports 20 are respectively referred to as output ports 0 to 3.

Congestion information from the output port 0 and information indicating a storage state of data whose destination corresponds to the output port 0 and which is stored in a first storage area 12-1 in the input buffer memory 12 included in the input port 10 are inputted into the AND circuit A10. In the example of FIG. 6, for convenience of description, it is assumed that the input buffer memory 12 includes a total of 6 storage areas 12-1 to 12-6, and data inputted into the input port 10 is sequentially inputted into the storage areas 12-1 to 12-6 in chronological order of input. When data is outputted from the input buffer memory 12 and a free storage area is generated in the storage areas, the remaining data are moved forward so that the free storage area is filled with data while the order of the data is maintained. Here, to move forward means to move toward the storage area 12-1, and in FIG. 6, the downward direction is the forward direction. Therefore, in the case of FIG. 6, data is stored in the input buffer memory 12 in a direction from bottom to top, and the earlier the data is stored in the input port 10, the lower the data is stored.

The congestion information from the output port 0 means the usage rate of the output buffer memory 22 included in the output port 0. For example, a case in which the usage rate (R) of the output buffer memory 22 is greater than or equal to 75% (0.75≤R) is defined as a heavy congestion state, a case in which the usage rate is smaller than 75% and greater than or equal to 50% (0.5≤R<0.75) is defined as a light congestion state, and a case in which the usage rate is smaller than 50% (R<0.5) is defined as a no congestion state. Here, the 75% (v % in FIG. 9) corresponds to a sixth threshold value, and the 50% (w % in FIG. 9) corresponds to a fifth threshold value. As shown in FIG. 6, the congestion information has a value of "0" in the no congestion state, a value of "1" in the light congestion state, and a value of "3" in the heavy congestion state. The congestion information includes 2 bits, and the congestion information has a value of "0" ("00" in binary) in the no congestion state, a value of "1" ("01" in binary) in the light congestion state, and a value of "3" ("11" in binary) in the heavy congestion state.

The information indicating a storage state of data whose destination corresponds to the output port 0 has a value of "1" when data whose destination corresponds to the output port 0 is stored in the storage area, and has a value of "0" when such data is not stored in the storage area.

Therefore, the AND circuit A10 outputs values as described below. When data stored in the first area (12-1) in the input buffer memory 12 includes data whose destination corresponds to the output port 0 and the usage rate of the output buffer memory 22 of the output port 0 is greater than or equal to 75% (0.75≤R), the AND circuit A10 outputs "0" (=11). Similarly, when data stored in the first area (12-1) in the input buffer memory 12 includes data whose destination corresponds to the output port 0 and the usage rate of the output buffer memory 22 of the output port 0 is smaller than 75% and greater than or equal to 50% (0.5≤R<0.75), the AND circuit A10 outputs "1" (=01). When data stored in the first area (12-1) in the input buffer memory 12 includes data whose destination corresponds to the output port 0 and the usage rate of the output buffer memory 22 of the output port 0 is smaller than 50% (R<0.5), the AND circuit A10 outputs "0" (=00). When data stored in the first area (12-1) in the input buffer memory 12 does not include data whose destination corresponds to the output port 0, the AND circuit A10 outputs "0" (=00).

In summary, when the destination of the data stored in the first area (12-1) in the input buffer memory 12 corresponds to the output port 0, the AND circuit A10 outputs a value corresponding to the usage rate of the output buffer memory 22 of the output port 0. The value corresponding to the usage rate of the output buffer memory 22 is "3" in the heavy congestion state (0.75≤R), "1" in the light congestion state (0.5≤R<0.75), and "0" in the no congestion state (R<0.5). On the other hand, when the destination of the data stored in the first area (12-1) in the input buffer memory 12 does not correspond to the output port 0, the AND circuit A10 outputs "0".

Similarly, when the destination of the data stored in the first area (12-1) in the input buffer memory 12 corresponds to the output port 1, the AND circuit A11 outputs a value corresponding to the usage rate of the output buffer memory 22 of the output port 1. The value corresponding to the usage rate of the output buffer memory 22 is the same as described above. On the other hand, when the destination of the data stored in the first area (12-1) in the input buffer memory 12 does not correspond to the output port 1, the AND circuit A11 outputs "0".

Similarly, when the destination of the data stored in the first area (12-1) in the input buffer memory 12 corresponds to the output port 2, the AND circuit A12 outputs a value corresponding to the usage rate of the output buffer memory 22 of the output port 2. The value corresponding to the usage rate of the output buffer memory 22 is the same as described above. On the other hand, when the destination of the data stored in the first area (12-1) in the input buffer memory 12 does not correspond to the output port 2, the AND circuit A12 outputs "0".

Similarly, when the destination of the data stored in the first area (12-1) in the input buffer memory 12 corresponds to the output port 3, the AND circuit A13 outputs a value corresponding to the usage rate of the output buffer memory 22 of the output port 3. The value corresponding to the usage rate of the output buffer memory 22 is the same as described above. On the other hand, when the destination of the data stored in the first area (12-1) in the input buffer memory 12 does not correspond to the output port 3, the AND circuit A13 outputs "0".

Similarly, when the destination of the data stored in the second area (12-2) in the input buffer memory 12 corresponds to the output port 0, the AND circuit A20 outputs a value corresponding to the usage rate of the output buffer memory 22 of the output port 0. The value corresponding to the usage rate of the output buffer memory 22 is the same as described above. On the other hand, when the destination of the data stored in the second area (12-2) in the input buffer memory 12 does not correspond to the output port 0, the AND circuit A20 outputs "0".

Similarly, when the destination of the data stored in the second area (12-2) in the input buffer memory 12 corresponds to the output port 1, the AND circuit A21 outputs a value corresponding to the usage rate of the output buffer memory 22 of the output port 1. The value corresponding to the usage rate of the output buffer memory 22 is the same as described above. On the other hand, when the destination of the data stored in the second area (12-2) in the input buffer memory 12 does not correspond to the output port 1, the AND circuit A21 outputs "0".

Similarly, when the destination of the data stored in the second area (12-2) in the input buffer memory 12 corresponds to the output port 2, the AND circuit A22 outputs a value corresponding to the usage rate of the output buffer memory 22 of the output port 2. The value corresponding to the usage rate of the output buffer memory 22 is the same as described above. On the other hand, when the destination of the data stored in the second area (12-2) in the input buffer memory 12 does not correspond to the output port 2, the AND circuit A22 outputs "0".

Similarly, when the destination of the data stored in the second area (12-2) in the input buffer memory 12 corresponds to the output port 3, the AND circuit A23 outputs a value corresponding to the usage rate of the output buffer memory 22 of the output port 3. The value corresponding to the usage rate of the output buffer memory 22 is the same as described above. On the other hand, when the destination of the data stored in the second area (12-2) in the input buffer memory 12 does not correspond to the output port 3, the AND circuit A23 outputs "0".

In the example of FIG. 6, the clock control unit 15 uses the usage rates (congestion information) of the output buffer memories 22 of the output ports corresponding to two data (frames) respectively stored in the two storage areas consisting of the first area (12-1) and the second area (12-2) in the input buffer memory 12. This is because, in the example, crossbar arbitration window size is 2, and data stored in the storage areas corresponding to the crossbar arbitration window size are used. Here, the crossbar arbitration window size means the number of data (the number of frames) in the input buffer memory 12 which are a target of the crossbar arbitration described below with reference to FIG. 7. When the crossbar arbitration window size is 3 or more, the sets of four AND circuits (A10 to A13 or A20 to A23) and one OR circuit (O11 or O21) (in the example of FIG. 6, two sets) are further increased according to the size.

In the example of FIG. 6, as the congestion information used in the control of the operating frequency performed by the clock control unit 15, the clock control unit 15 uses congestion information related to the destinations of the data stored in the storage areas corresponding to the crossbar arbitration window size, in other words, the data stored in the first and the second storage areas in the input buffer memory 12. However, the congestion information is not limited to this example. As the congestion information used in the control of the operating frequency, it is possible to set congestion information which is related to destinations of data stored in the storage areas, the number of which counted from the first storage area in the input buffer memory 12 may be arbitrarily set. For example, by providing a fourth register having 2 bits in the clock control unit 15 for this setting, it is possible to set 4 different types of settings including only the first storage area, the first and the second storage areas, the first to the fourth storage areas, and the first to the eighth storage areas in the 8 storage areas in the input buffer memory 12.

Return to the description of FIG. 6. The outputs of the AND circuits A10, A11, A12, and A13 are inputted into the OR circuit O11. Among the four AND circuits A10, A11, A12, and A13, one AND circuit connected to the output port corresponding to the destination of the data stored in the first storage area in the input buffer memory 12 outputs the usage rate of the output buffer memory 22 of the output port. On the other hand, the outputs of the three AND circuits other than the one AND circuit are "0" (=00).

Therefore, when the usage rate of the output buffer memory 22 of the output port corresponding to the destination of the data stored in the first storage area in the input buffer memory 12 indicates "heavy congestion state", the OR circuit O11 outputs a value ("3"=11) indicating "heavy congestion state". Similarly, when the usage rate of the output buffer memory 22 of the output port corresponding to the destination of the data stored in the first storage area in the input buffer memory 12 indicates "light congestion state", the OR circuit O11 outputs a value ("1"=01) indicating "light congestion state". Similarly, when the usage rate of the output buffer memory 22 of the output port corresponding to the destination of the data stored in the first storage area in the input buffer memory 12 indicates "no congestion state", the OR circuit O11 outputs a value ("0"=00) indicating "no congestion state".

Similarly, when the usage rate of the output buffer memory 22 of the output port corresponding to the destination of the data stored in the second storage area in the input buffer memory 12 indicates "heavy congestion state", the OR circuit O21 outputs a value ("3"=11) indicating "heavy congestion state". Similarly, when the usage rate of the output buffer memory 22 of the output port corresponding to the destination of the data stored in the second storage area in the input buffer memory 12 indicates "light congestion state", the OR circuit O21 outputs a value ("1"=01) indicating "light congestion state". Similarly, when the usage rate of the output buffer memory 22 of the output port corresponding to the destination of the data stored in the second storage area in the input buffer memory 12 indicates "no congestion state", the OR circuit O21 outputs a value ("0"=00) indicating "no congestion state".

The outputs of the OR circuits O11 and O21 are inputted into each of the AND circuit A31 and the OR circuit O31. As a result, each of the AND circuit A31 and the OR circuit O31 outputs values as described below according to a 2-bit output 00 ("0"), 01 ("1"), or 11 ("3") of each of the two OR circuits O11 and O21. If either of the outputs of the OR circuits O11 and O21 is 00 ("0"), the AND circuit A31 outputs 00 ("0"). In this case, the clock control circuit 15 does not reduce the operating frequency in the clock domain 17 and uses the frequency of the clock signal CLK as the operating frequency. Specifically, when either of the usage rates of the output buffer memories 22 of the output ports corresponding to the destinations of two data stored in the first and the second storage areas in the input buffer memory 12 is smaller than 50% (no congestion), the clock control circuit 15 does not reduce the operating frequency.

On the other hand, if neither of the outputs of the OR circuits O11 and O21 are 00 ("0"), the AND circuit A31 outputs a value (01 or 11) other than 00 ("0"). In this case, the clock control circuit 15 reduces the operating frequency in the clock domain 17. Specifically, when both of the usage rates of the output buffer memories 22 of the output ports corresponding to the destinations of two data stored in the first and the second storage areas in the input buffer memory 12 are greater than or equal to 50% (heavy or light congestion state), the clock control circuit 15 reduces the operating frequency. More specifically, if either of the outputs of the OR circuits O11 and O21 is 11 ("3") (heavy congestion state), the OR circuit O31 outputs 11 ("3"). In this case, the clock control circuit 15 sets the operating frequency in the clock domain 17 to 1/4 (first ratio) of the frequency of the clock signal CLK. On the other hand, if both of the outputs of the OR circuits O11 and O21 are 01 ("1") (light congestion state), the OR circuit O31 outputs 01 ("1"). In this case, the clock control circuit 15 sets the operating frequency in the clock domain 17 to 1/2 (second ratio) of the frequency of the clock signal CLK.

Specifically, the clock control unit 15 performs the control described below according to the outputs of the AND circuit A31 and the OR circuit O31. When at least one of the usage rates of the output buffer memories 22 of the output ports corresponding to the destinations of (two) storage data in the first and the second storage areas (12-1 and 12-2) in the input buffer memory 12 indicates the no congestion state (smaller than 50%), the clock control circuit 15 does not reduce the operating frequency. On the other hand, when both of the usage rates of the output buffer memories 22 of the output ports corresponding to the destinations of the (two) storage data indicate a state other than the no congestion state (heavy or light congestion state) (50% or more), the clock control circuit 15 reduces the operating frequency. In this case, the clock control circuit 15 performs control according to the congestion states indicated by the usage rates of the output buffer memories 22 of the output ports corresponding to the destinations of the (two) storage data. Specifically, when the congestion information related to the destinations of the (two) storage data indicates the heavy congestion state or the light congestion state, the clock control circuit 15 controls the operating frequency in the clock domain 17 of the input port according to the heaviest congestion state of the congestion states.

More specifically, the clock control unit 15 in the example of FIG. 6 performs the control described below. The control unit 15 employs a larger reduction ratio between the reduction ratio of the operating frequency according to the congestion state related to the destination of the data stored in the input port and the reduction ratio of the operating frequency according to the usage rate of the input buffer 12 of the input port.

Specifically, when the congestion states of the output ports related to the two storage data in the first and the second storage areas in the input buffer memory 12 are the heavy or the light congestion state and the heaviest congestion state is the heavy congestion state, the control unit 15 sets the operating frequency to 1/4 (first ratio) of the frequency of the clock signal CLK regardless of the usage rate of the input buffer memory 12 of the input port 10.

On the other hand, when the congestion states of the output ports related to the two storage data are the heavy or the light congestion state and the heaviest congestion state is the light congestion state, the control unit 15 performs the control described below according to the usage rate of the input buffer memory 12 of the input port 10. When the usage rate of the input buffer memory 12 is smaller than or equal to 50% (R≤50), the control unit 15 sets the operating frequency to 1/4 of the frequency of the clock signal CLK. When the usage rate of the input buffer memory 12 is greater than 50% and smaller than or equal to 75% (0.5<R≤0.75), the control unit 15 sets the operating frequency to 1/2 (second ratio) of the frequency of the clock signal CLK. When the usage rate of the input buffer memory 12 is greater than 75% (0.75<R), the control unit 15 sets the operating frequency to 1/2 of the frequency of the clock signal CLK according to the light congestion state.

When neither of the congestion states related to the two storage data are the no congestion state, the control unit 15 performs the control described below according to the usage rate of the input buffer memory 12 of the input port 10. When the usage rate of the input buffer memory 12 is smaller than or equal to 50% (R≤50), the control unit 15 sets the operating frequency to 1/4 of the frequency of the clock signal CLK. When the usage rate of the input buffer memory 12 is greater than 50% and smaller than or equal to 75% (0.5<R≤0.75), the control unit 15 sets the operating frequency to 1/2 of the frequency of the clock signal CLK. When the usage rate of the input buffer memory 12 is greater than 75% (0.75<R), the control unit 15 sets the operating frequency to the same frequency as that of the clock signal CLK.

As described above, according to the second embodiment, the control of the operating frequency of the input port 10 is performed as described below. A larger reduction ratio between the reduction ratio of the operating frequency according to the congestion state related to the destination of the data stored in the input port (first factor) and the reduction ratio of the operating frequency according to the usage rate of the input buffer 12 of the input port (second factor) is employed. From the point of view in which, when the usage rate of the input buffer memory 12 of the input port 10 (first factor) is high, the increase of the usage rate is suppressed or the usage rate is reduced so that inputs from the outside are not interrupted, it is desired to perform processing without reducing the operating frequency so much (first request). On the other hand, from the point of view in which, when the congestion state related to the destination of the data stored in the input port (second factor) is heavy, the congestion state is reduced, it is desired to reduce the operating frequency to delay the processing and suppress outputs (second request). Therefore, in the second embodiment, by considering together the first request and the second request, even when the usage rate of the input buffer memory 12 (first factor) is high, if the congestion state related to the destination of the data stored in the input port (second factor) is heavy, the second request is weighed heavily and the operating frequency may be reduced. As a result, the first request and the second request are balanced (traded off), so that an appropriate control of the operating frequency can be realized.

Also in the second embodiment, it is possible to use the control method, which is described with reference to FIG. 5 as a modification example of the first embodiment, for controlling the operating frequency according to the usage rate of the buffer memory in the case in which the input buffer memory 12 and the output buffer memory 22 are divided for each priority of data. In this case, the congestion information of a portion of the output buffer memory 22 of the output port related to the destination of the data stored in a portion of the portions obtained by dividing the input buffer memory 12 for each priority of data is used, and the operating frequency of the portion in the input port 10 is controlled.

Also in the second embodiment, when the input buffer memory 12 is divided for each group of output ports of destinations of data as described above in the modification example of the first embodiment, it is possible to perform control as described below. Specifically, by using the same method as that described above with reference to FIG. 5, it is possible to control the operating frequency according to the congestion state of the output port of the destination of the storage data for each portion of the input buffer memory 12.

Similarly, also in the second embodiment, when the output buffer memory 22 is divided for each group of input ports that output data as described above in the modification example of the first embodiment, it is possible to control the operating frequency according to the usage rate of each portion of the output buffer memory by the same method as that described above with reference to FIG. 5.

When the modification example of the first embodiment is applied to the second embodiment as described above, except for the first register, two second registers, two third registers, and two fourth registers can be provided for the divided two portions. Or, by employing the same configuration as that in which one second register and one third register can be provided and shared by the divided two portions in the modification example of the first embodiment, one second register, one third register, and one fourth register can be provided and shared by the divided two portions.

Next, the crossbar arbitration window will be described with reference to FIG. 7. In this case, in the same manner as described above, the crossbar arbitration window size is assumed to be 2. Specifically, competition between the input ports 10 is arbitrated for the two data stored in the first and the second storage areas in the input buffer memory 12 of each input port 10.

Figure 7:
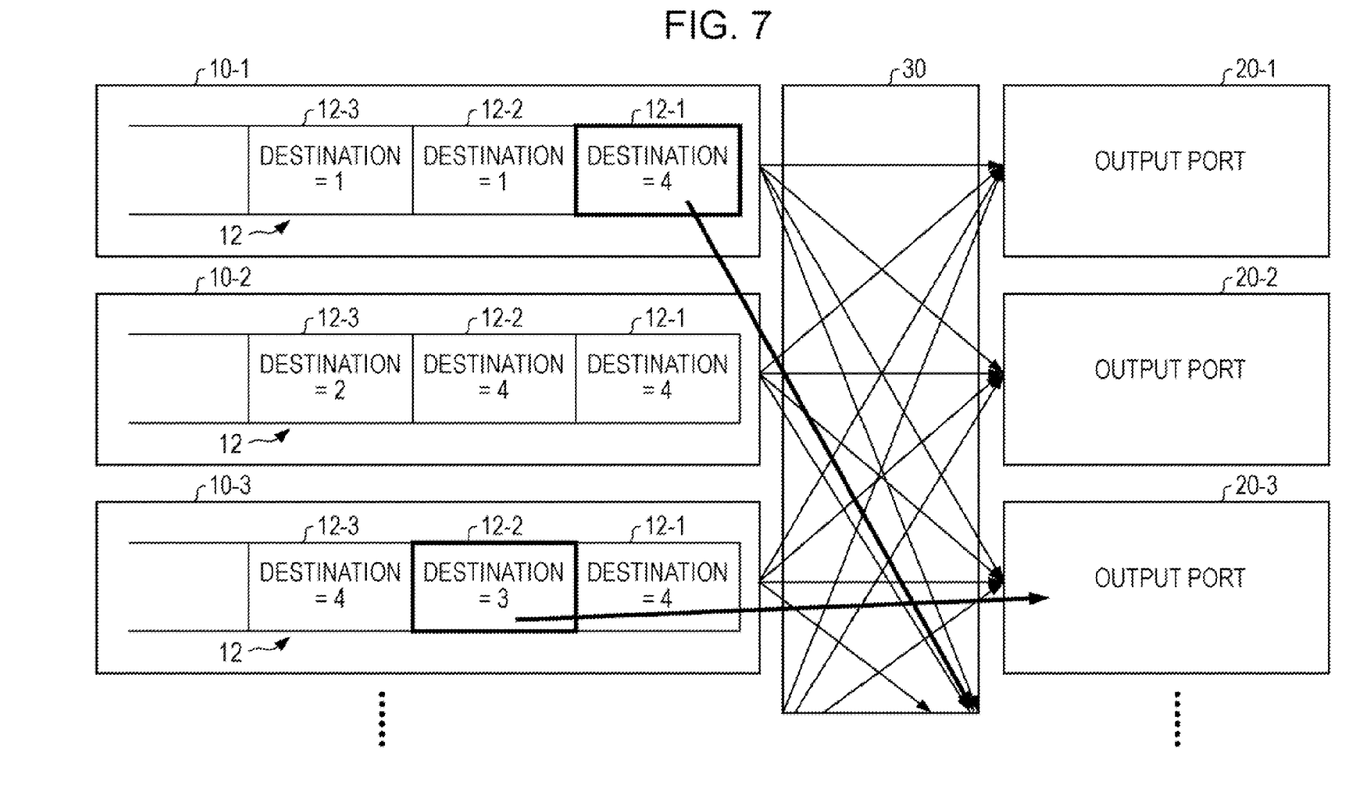
FIG. 7 is a diagram for explaining a crossbar arbitration window applicable to the data transfer apparatus shown in FIG. 1.

Specifically, in FIG. 7, the data in the first storage area of the input port 10-1 (destination=output port 20-4) competes with the data in the first and the second storage areas of the input port 10-2 and the data in the first storage area of the input port 10-3, all of which have the same destination. Here, the data in the first storage area of the input port 10-1 wins the competition and the data is outputted to the output port 20-4 via the crossbar 30. The reasons for wins and losses in the competition are determined by, for example, the priority order among the input ports.

In FIG. 7, in the input port 10-2, the data in the first and the second storage areas lose in the competition with the input port 10-1, so that the data cannot be outputted. Although the data in the third storage area does not compete with other input ports, the data in the third storage area is not the data to be outputted because the crossbar arbitration window size is 2 as described above.

In FIG. 7, in the input port 10-3, the data in the first storage area loses in the competition with the input port 10-1 as described above, so that the data cannot be outputted. However, the data in the second storage area does not compete with other input ports because the destination of the data is the output port 20-3, so that the data is outputted to the output port 20-3 via the crossbar 30.

In the data transfer apparatus 100, competition between the data in the storage areas corresponding to the crossbar arbitration window size in the input buffer memory 12 of each input port 10 and other input ports is arbitrated by the crossbar arbitration as described above. If the data does not compete with other input ports, the data is outputted to the destination output port. On the other hand, if the data competes with other input ports, the data is outputted to the destination output port only when the data wins in the competition. If the data loses in the competition, the data waits until the competition disappears. Thereafter, only when the competition disappears or the data wins in the competition, the data is outputted to the destination output port.

Next, the flow of the control operation performed by the clock control units 15 and 25 in the second embodiment will be described with reference to FIGS. 8 and 9.

Figure 8:
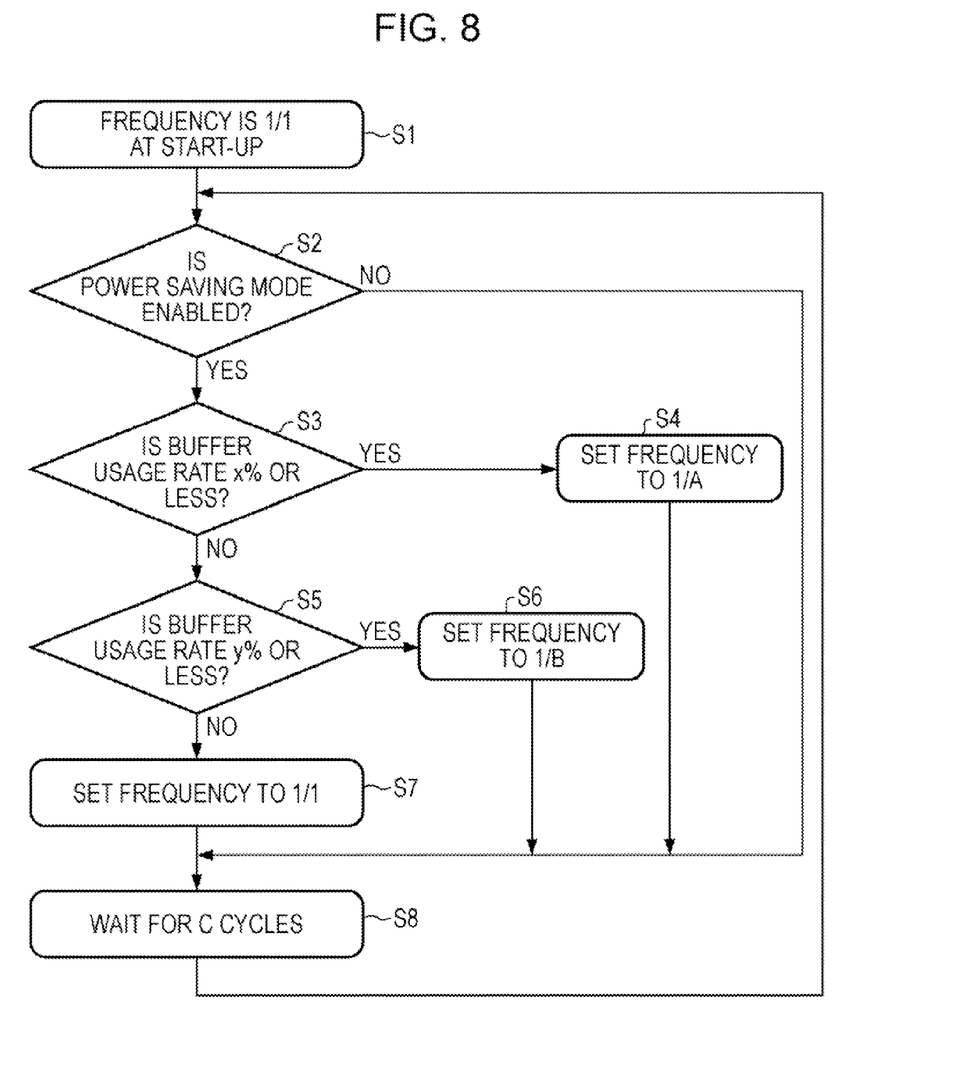
FIG. 8 is a flowchart for explaining a control method (output port) for controlling an operating frequency applicable to the data transfer apparatus shown in FIG. 1.

FIG. 8 is a flowchart showing the flow of the control operation performed by the clock control unit 25 in each output port 20.

In FIG. 8, when the data transfer apparatus 100 starts up, the operating frequency in the clock domain 27 is set to the frequency of the clock signal CLK (step S1). Next, it is determined whether or not the power saving mode is enabled (step S2). If the power saving mode is disabled, the process moves to step S8, waits for a predetermined time (step S8), and moves to step S2 again.

If the power saving mode is enabled in step S2, it is determined whether or not the usage rate of the output buffer memory 22 of the output port 20 is smaller than or equal to x % (=50%) (third threshold value=TH2) (step S3). If the usage rate is smaller than or equal to x % (R≤0.5), the operating frequency is set to 1/A (=1/4) (third ratio) of the frequency of the clock signal CLK (step S4), and the process moves to step S8.

If the usage rate is greater than x % in step S3, it is determined whether or not the usage rate is smaller than or equal to y % (=75%) (fourth threshold value=TH1) that is greater than x % (step S5). Here, the fourth threshold value (y %=75%) is greater than the third threshold value (x %=50%). If the usage rate is greater than x % and smaller than or equal to y % (0.5<R≤0.75), the operating frequency is set to 1/B (=1/2) (fourth ratio) of the frequency of the clock signal CLK (step S6), and the process moves to step S8. Here, the fourth ratio (1/B=1/2) is smaller than the third ratio (1/A=1/4). If the usage rate is greater than y % (0.75<R) in step S5, the operating frequency is set to the frequency of the clock signal CLK (step S7), and the process moves to step S8.

Figure 9:
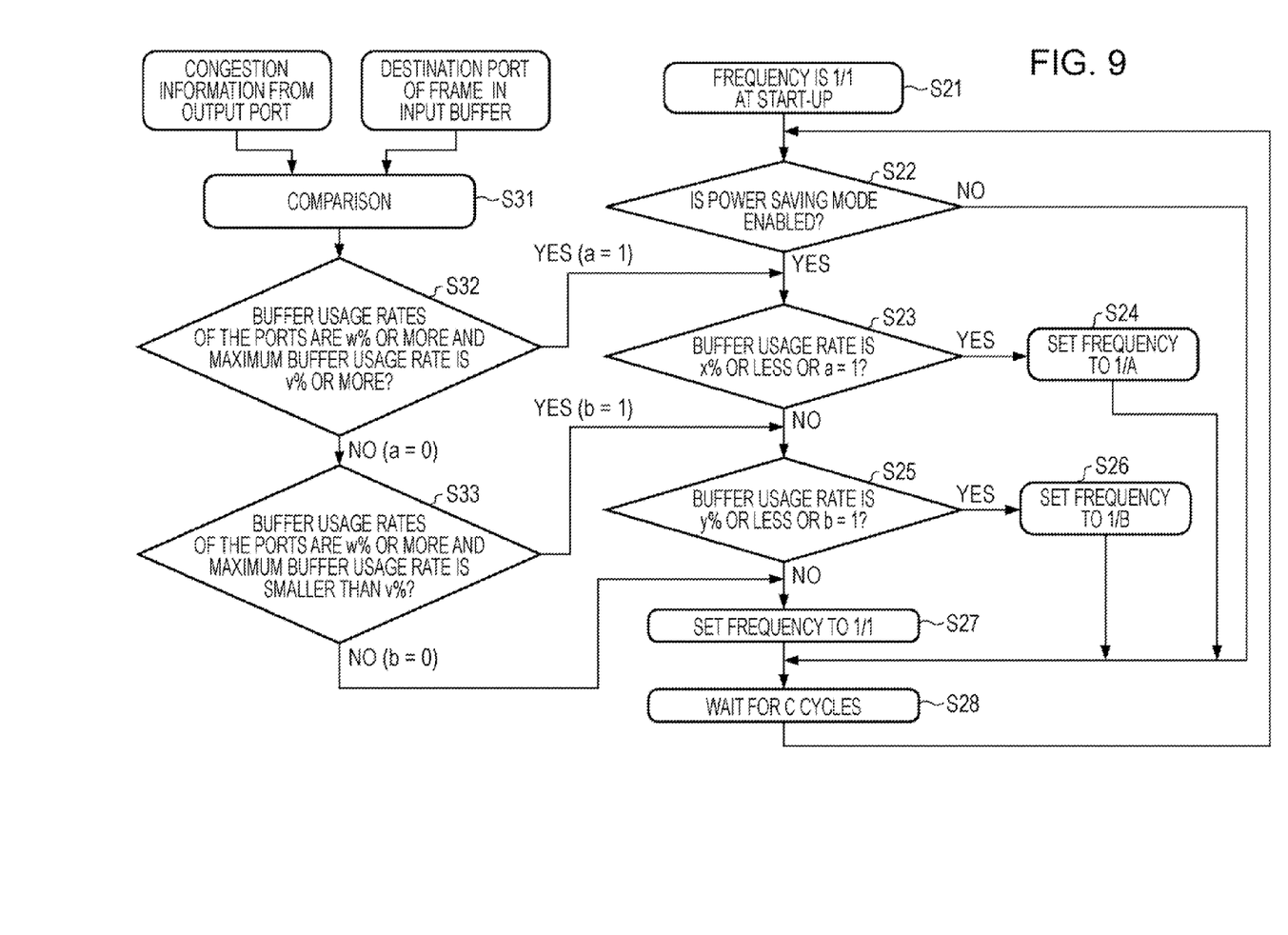
FIG. 9 is a flowchart for explaining a control method (input port) for controlling an operating frequency applicable to the data transfer apparatus shown in FIG. 1.

FIG. 9 is a flowchart showing the flow of the operation performed by the clock control unit 15 in each input port 10.

In FIG. 9, when the data transfer apparatus 100 starts up, the operating frequency in the clock domain 17 is set to the frequency of the clock signal CLK (step S21). Next, it is determined whether or not the power saving mode is enabled (step S22). If the power saving mode is disabled, the process moves to step S28, waits for a predetermined time (step S28), and moves to step S22 again. If the power saving mode is disabled in step S22, the process moves to step S23 and step S32.

On the other hand, the usage rates of the output buffer memories 22 of the output ports 20 corresponding respectively to the destinations of the data in the storage areas corresponding to the crossbar arbitration window size in the input buffer memory 12 of the input port 10 is obtained (step S31). In the example of FIG. 6, the storage areas corresponding to the crossbar arbitration window size are the first and the second storage areas (12-1 and 12-2).

In step S32, it is determined whether or not both of the obtained usage rates are greater than or equal to w % (=50%) (fifth threshold value) and include a usage rate of v % (=75%) (sixth threshold value) or more. Here, the sixth threshold value (v %=75%) is greater than the fifth threshold value (w %=50%).

Then, it is determined whether or not both of the obtained usage rates are greater than or equal to w % and include a usage rate of v % or more (YES in step S32) or the usage rate of the input buffer memory 12 of the input port 10 is smaller than or equal to x % (=50%) (first threshold value=TH2) (step S23).

If both of the obtained usage rates are greater than or equal to w % and include a usage rate of v % or more (YES in step S32) or the usage rate of the input buffer memory 12 of the input port 10 is smaller than or equal to x %, the process moves to step S24. In step S24, the operating frequency is set to 1/A (=1/4) (first ratio) of the frequency of the clock signal CLK, and the process moves to step S28.

If the condition that both of the obtained usage rates are greater than or equal to w % and include a usage rate of v % or more is not satisfied (NO in step S32) and the usage rate of the input buffer memory 12 of the input port 10 is greater than x % (NO in step S23), the process moves to step S33 and step S25.

In step S33, it is determined whether or not both of the obtained usage rates are greater than or equal to w % but does not include a usage rate of v % or more. Then, it is determined whether or not both of the obtained usage rates are greater than or equal to w % but does not include a usage rate of v % or more (YES in step S33) or the usage rate of the input buffer memory 12 is greater than x % and smaller than or equal to y % (second threshold value) (0.5<R≤0.75) (step S25).

In step S25, if both of the obtained usage rates are greater than or equal to w % but does not include a usage rate of v % or more (YES in step S33) or the usage rate of the input buffer memory 12 is greater than x % and smaller than or equal to y % (second threshold value) (0.5<R≤0.75), the process moves to step S26.

In step S26, the operating frequency is set to 1/B (=1/2) (second ratio) of the frequency of the clock signal CLK (step S26), and the process moves to step S28. Here, the second threshold value (x %=50%) is smaller than the first threshold value (y %=75%), and the second ratio (1/B=1/2) is smaller than the first ratio (1/A=1/4).

In step S25, if the condition that both of the obtained usage rates are greater than or equal to w % but does not include a usage rate of v % or more is not satisfied (NO in step S33) and the usage rate of the input buffer memory 12 is greater than y % (0.75<R) (NO in step S25), the process moves to step S27.

In step S27, the operating frequency is set to the frequency of the clock signal CLK, and the process moves to step S28.

In step S33, the case in which the condition that both of the obtained usage rates are greater than or equal to w % but does not include a usage rate of v % or more is not satisfied is a case in which the usage rates include a usage rate of less than w % (R<0.5).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transfer apparatus comprising:
a plurality of input ports, each of the plurality of input ports including:
an input buffer configured to store input data, each piece of the input data including destination information indicating a destination of the each piece of the input data,
a first buffer monitoring unit configured to monitor a first usage rate of the input buffer, the first usage rate being a ratio of a portion of the input buffer, which is currently used by the stored input data, to a total storage capacity of the input buffer, and
a first frequency control unit configured to control a first operating frequency of the input buffer on the basis of the first usage rate;
a plurality of output ports, each of the plurality of output ports including:
an output buffer configured to store output data,
a second buffer monitoring unit configured to monitor a second usage rate of the output buffer, the second usage rate being a ratio of a portion of the output buffer, which is currently used by the stored output data, to a total storage capacity of the output buffer, and
a second frequency control unit configured to control a second operating frequency of the output buffer on the basis of the second usage rate; and
a switch unit provided between the plurality of input ports and the plurality of output ports and configured to supply a piece of the input data, as a piece of the output data, to the output port corresponding to the destination of the piece of the input data on the basis of the destination information of the piece of the input data, wherein
the first and second frequency control units are each configured to include a gate circuit that is inserted in a supply path of a clock signal; and
the first and second operating frequencies are reduced based on the first and second usage rates, respectively, by controlling the gate circuit so that clock pulses are cut off or passed through to a circuit area including the input or output buffer, beyond the gate circuit.

2. The data transfer apparatus according to claim 1, wherein the first frequency control unit is configured to set the first operating frequency to a first frequency when the first usage rate is larger than a first threshold and set the first operating frequency to a second frequency when the first usage rate is smaller than the first threshold, the second frequency being smaller than the first frequency, wherein the second frequency control unit is configured to set the second operating frequency to a third frequency when the second usage rate is larger than a second threshold and set the second operating frequency to a fourth frequency when the second usage rate is smaller than the second threshold, the fourth frequency being smaller than the third frequency.

3. The data transfer apparatus according to claim 1, wherein, in each of the plurality of input ports, the first buffer monitoring unit is configured to monitor a third usage rate of the output buffer corresponding to the destination of at least one piece of the input data stored in the input buffer, and the first frequency control unit is configured to control the first operating frequency on the basis of the first usage rate and the third usage rate.

4. The data transfer apparatus according to claim 3, wherein, in each of the plurality of input ports, the first frequency control unit is configured to set the first operating frequency to a fifth frequency when the third usage rate is larger than a third threshold or when the first usage rate is smaller than a fourth threshold and set the first operating frequency to a sixth frequency when the third usage rate is smaller than the third threshold and the first usage rate is larger than the fourth threshold, the fifth frequency being smaller than the sixth frequency.

5. The data transfer apparatus according to claim 1,
wherein, in each of the plurality of input ports, a data storing region of the input buffer is divided into a plurality of storing portions for storing the input data,
wherein, in each of the plurality of input ports, the first buffer monitoring unit is configured to monitor a fourth usage rate of each of respective storing portions of the input buffer, and the first frequency control unit is configured to control the first operating frequency on the basis of one of the fourth usage rates by setting the one of the fourth usage rates as the first usage rate,
wherein, in each of the plurality of output ports, a data storing region of the output buffer is divided into a plurality of storing portions for storing the output data,
wherein, in each of the plurality of output ports, the second buffer monitoring unit is configured to monitor fifth usage rates of respective storing portions of the output buffer as the second usage rate, and the second frequency control unit is configured to control the second operating frequency on the basis of one of the fifth usage rates by setting the one of the fifth usage rates as the second usage rate.

6. The data transfer apparatus according to claim 5,
wherein, in each of the plurality of input ports, the first buffer monitoring unit is configured to monitor a sixth usage rate of each of the output buffers corresponding to the destinations of plural pieces of the input data stored in respective storing portions of the input buffer, and the first frequency control unit is configured to control the first operating frequency on the basis of the one of the fourth usage rates and one of the sixth usage rates.

7. The data transfer apparatus according to claim 1,
wherein each of the input ports further includes a first processing unit configured to perform a first process for the input data outputted from the input buffer, an operating frequency of the first process being the first operating frequency,
wherein each of the output ports further includes a second processing unit configured to perform a second process for the output data outputted from the output buffer, an operating frequency of the second process being the second operating frequency.

8. The data transfer apparatus according to claim 1,
wherein each of the input ports further includes a synchronizing unit configured to synchronize the input data outputted from the input buffer at the first operating frequency with a clock signal of the switch unit, the clock signal having a third operating frequency different from the first operating frequency.

9. A method for transferring data from a plurality of input ports including input buffers and first frequency control units to a plurality of output ports including output buffers and second frequency control units through a switch unit, the method comprising:
storing input data in the input buffer of one of the plurality of input ports, each piece of the input data including destination information indicating a destination of the each piece of the input data;
monitoring a first usage rate in each of the plurality of input buffers, the first usage rate being a ratio of a portion of the input buffer, which is currently used by the stored input data, to a total storage capacity of the input buffer;
controlling, by the first frequency control unit, a first operating frequency of the input buffer on the basis of the first usage rate in each of the plurality of input buffers;
supplying a piece of the input data, as a piece of output data, to the output port corresponding to the destination of the piece of the input data on the basis of the destination information of the piece of the input data;
storing the output data in the output buffer of one of the plurality of output ports;
monitoring a second usage rate in each of the plurality of output buffers, the second usage rate being a ratio of a portion of the output buffer, which is currently used by the stored output data, to a total storage capacity of the output buffer; and
controlling, by the second frequency control unit, a second operating frequency of the output buffer on the basis of the second usage rate in each of the plurality of input buffers, wherein
the first and second frequency control units are each configured to include a gate circuit that is inserted in a supply path of a clock signal; and
the first and second operating frequencies are reduced based on the first and second usage rates, respectively, by controlling the gate circuit so that clock pulses are cut off or passed through to a circuit area including the input or output buffer, beyond the gate circuit.

10. The method according to claim 9,
wherein the controlling the first operating frequency includes:
setting the first operating frequency to a first frequency when the first usage rate is larger than a first threshold, and
setting the first operating frequency to a second frequency when the first usage rate is smaller than the first threshold, the second frequency being smaller than the first frequency,
wherein the controlling the second frequency control unit includes: setting the second operating frequency to a third frequency when the second usage rate is larger than a second threshold, and
setting the second operating frequency to a fourth frequency when the second usage rate is smaller than the second threshold, the fourth frequency being smaller than the third frequency.

11. The method according to claim 9, further comprising:
monitoring a third usage rate of the output buffer corresponding to the destination of at least one piece of the input data stored in the input buffer in each of the plurality of input ports; and
controlling, by the first frequency control unit, the first operating frequency on the basis of the first usage rate and the third usage rate in each of the plurality of input ports.

12. The method according to claim 11,
wherein the controlling the first operating frequency includes:
setting the first operating frequency to a fifth frequency when the third usage rate is larger than a third threshold or when the first usage rate is smaller than a fourth threshold, and
setting the first operating frequency to a sixth frequency when the third usage rate is smaller than the third threshold and the first usage rate is larger than the fourth threshold, the fifth frequency being smaller than the sixth frequency.

13. The method according to claim 9,
wherein, in each of the plurality of input ports, a data storing region of the input buffer is divided into a plurality of storing portions for storing the input data,
wherein, in each of the plurality of output ports, a data storing region of the output buffer is divided into a plurality of storing portions for storing the output data, wherein the monitoring the first usage rate includes monitoring a fourth usage rate of each of respective storing portions of the input buffer as the first usage rate, and the controlling the first operating frequency includes controlling, by the first frequency control unit, the first operating frequency on the basis one of the fourth usage rates by setting the one of the fourth usage rates as the first usage rate, wherein the monitoring the second usage rate includes monitoring fifth usage rates of respective storing portions of the output buffer as the second usage rate, and the controlling the second operating frequency includes controlling, by the second frequency control unit, the second operating frequency on the basis of one of the fifth usage rates by setting the one of the fifth usage rates as the second usage rate.

14. The method according to claim 13, further comprising:

monitoring a sixth usage rate of each of the output buffers corresponding to the destinations of plural pieces of the input data stored in respective storing portions of the input buffer in each of the plurality of input ports; and controlling, by the first frequency control unit, the first operating frequency on the basis of the one of the fourth usage rates and one of the sixth usage rates in each of the plurality of input ports.

15. The method according to claim 9, further comprising:

performing a first process for the input data outputted from the input buffer in each of the input ports, an operating frequency of the first process being the first operating frequency; and performing a second process for the output data outputted from the output buffer at the second operating frequency in each of the output ports, an operating frequency of the second process being the second operating frequency.

16. The method according to claim 9, further comprising:

synchronizing the input data outputted from the input buffer at the first operating frequency with a clock signal of the switch unit, the clock signal having a third operating frequency different from the first operating frequency.

* * * * *